(12) United States Patent
Chartrand

(10) Patent No.: US 8,069,299 B2
(45) Date of Patent: Nov. 29, 2011

(54) BANDED INDIRECTION FOR NONVOLATILE MEMORY DEVICES

(75) Inventor: Brent Chartrand, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 12/165,562

(22) Filed: Jun. 30, 2008

(65) Prior Publication Data

US 2009/0327582 A1 Dec. 31, 2009

(51) Int. Cl.
*G06F 12/00* (2006.01)
(52) U.S. Cl. .............. 711/103; 711/4; 711/5; 711/100; 711/102
(58) Field of Classification Search ............. 711/4, 100, 711/102–103
See application file for complete search history.

(56) References Cited

U.S. PATENT DOCUMENTS

| 7,877,524 | B1 * | 1/2011 | Annem et al. .................. 710/26 |
| 2007/0073996 | A1 * | 3/2007 | Kruger et al. ................. 711/207 |
| 2007/0143378 | A1 * | 6/2007 | Gorobets ..................... 707/205 |
| 2008/0077762 | A1 * | 3/2008 | Scott et al. ................... 711/170 |

\* cited by examiner

*Primary Examiner* — Tuan Thai
*Assistant Examiner* — Zhuo Li
(74) *Attorney, Agent, or Firm* — Schubert Law Group PLLC

(57) ABSTRACT

Methods, apparatuses, and computer program products that enable banded indirection for nonvolatile memory devices, such as flash memory devices, are disclosed. One or more embodiments comprise a method for performing banded indirection when accessing data of a nonvolatile device. The methods comprise tracking fragmentation of a band of physical addresses of the nonvolatile memory device, storing a physical address of the band, and accessing data of a logical address of the band via the stored physical address based on the fragmentation of the band. Some embodiments comprise apparatuses for accessing data of nonvolatile devices using banded indirection. The embodiments comprise a nonvolatile memory element to store data, wherein the nonvolatile memory element has bands of physical addresses, a fragmentation detector to detect fragmentation of a band of the nonvolatile memory, and a data access module to access data of the band via a physical address based on the fragmentation.

19 Claims, 6 Drawing Sheets

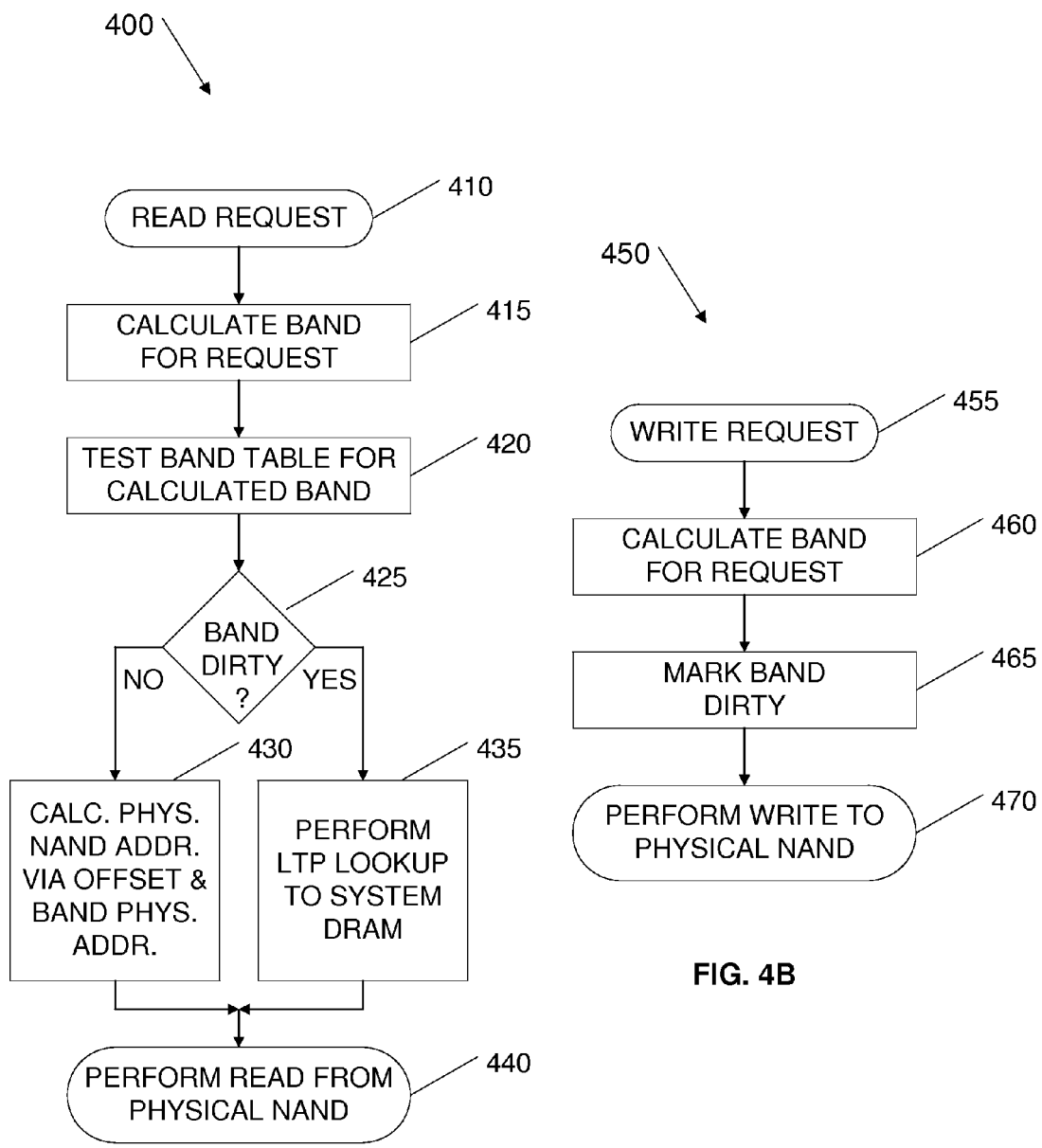

BANDED INDIRECTION FOR NONVOLATILE MEMORY DEVICES

FIELD

The embodiments herein generally relate to the field of nonvolatile memory devices. More particularly, the embodiments relate to methods and apparatuses for accessing data of nonvolatile memory devices using banded indirection.

BACKGROUND

Many different types and styles of semiconductor memory devices exist to store data for electronic devices such as computers, portable media players, and digital cameras. For example, dynamic random access memory (DRAM) and static random access memory (SRAM) are two types of volatile memory. Programmable read only memory, electrically erasable programmable read only memory (EEPROM), and flash memory are three common types of nonvolatile memory. Flash memory is nonvolatile computer memory that can be electrically erased and reprogrammed. Because flash memory costs far less than many of the various nonvolatile memory technologies, designers tend to use flash memory elements in systems wherever significant amounts of nonvolatile, solid-state storage is needed.

Two types of flash memory are NOR-based flash memory and NAND-based flash memory. NOR flash memory elements generally have long erase and/or write times, but have the advantage of allowing random access to individual memory locations. NAND flash memory uses tunnel injection for writing and tunnel release for erasing. NAND flash memory devices are common in such technology sectors as removable universal serial bus (USB) storage devices and many types of memory cards, such as memory cards for digital cameras, digital video recorders, and portable music players.

NAND memory technologies typically require an embedded processor to perform a logical-to-physical (LTP) translation. The LTP translation presents memory storage in a linear, block-oriented view to system software or an operating system. The LTP translation is usually necessary due to numerous NAND memory requirements, such as the need to erase before writing, performing wear leveling to maximize device life, and handling bad blocks and other media issues. Systems generally implement LTP translation via an LTP array in system memory. The LTP array maps the logical address presented to the system to a physical NAND block as stored on the memory device. For example, a typical case of one 32 bit table entry for each 4 kilobyte (KB) NAND page, the LTP array size may be 1 megabyte (MB) for each 1 gigabyte (GB) of NAND memory. Implementing LTP array maps in system memory are generally used for host-based systems, where access to system dynamic random access memory (DRAM) may be fast and relatively efficient.

Some systems, such as embedded systems, reduce the need for accesses to LTP arrays by using a technique referred to as "Delta Tables". The Delta Table method uses a tree structure of 'deltas' to describe fragmented areas of the memory device, where data stored on the device is fragmented or scattered around physical memory locations of the device. This mechanism may work well in some situations, but is inefficient for workloads having a large number of small writes, such as when a system uses the memory device as a write-back cache. Additionally, the Delta Table method frequently requires large amounts of memory to contain the delta tables.

BRIEF DESCRIPTION OF THE DRAWINGS

Aspects of the embodiments will become apparent upon reading the following detailed description and upon reference to the accompanying drawings in which like references may indicate similar elements:

FIGS. 4A-4B show flowcharts for how an embodiment may process read requests and write requests using banded indirection.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Methods, apparatuses, and computer program products that enable banded indirection for nonvolatile memory devices, such as flash memory devices, are contemplated. Some embodiments comprise a method for performing banded indirection when accessing data of a nonvolatile device. The methods comprise tracking fragmentation of a band of physical addresses of the nonvolatile memory device, storing a physical address of the band, and accessing data of a logical address of the band via the stored physical address based on the fragmentation of the band.

Some embodiments comprise apparatuses for accessing data of nonvolatile devices using banded indirection. The embodiments comprise a nonvolatile memory element to store data, wherein the nonvolatile memory element has bands of physical addresses, a fragmentation detector to detect fragmentation of a band of the nonvolatile memory, and a data access module to access data of the band via a physical address based on the fragmentation.

Some embodiments comprise computer program products that perform banded indirection for nonvolatile memory devices. The embodiments comprise computer program products of a tangible computer usable medium having computer usable program code for reading data from nonvolatile memory, the computer program product including code for receiving a read request for a logical page of the nonvolatile memory, detecting fragmentation of a band of the nonvolatile memory, and reading the data from the nonvolatile memory via a physical page if the band is defragmented.

Figure 1:
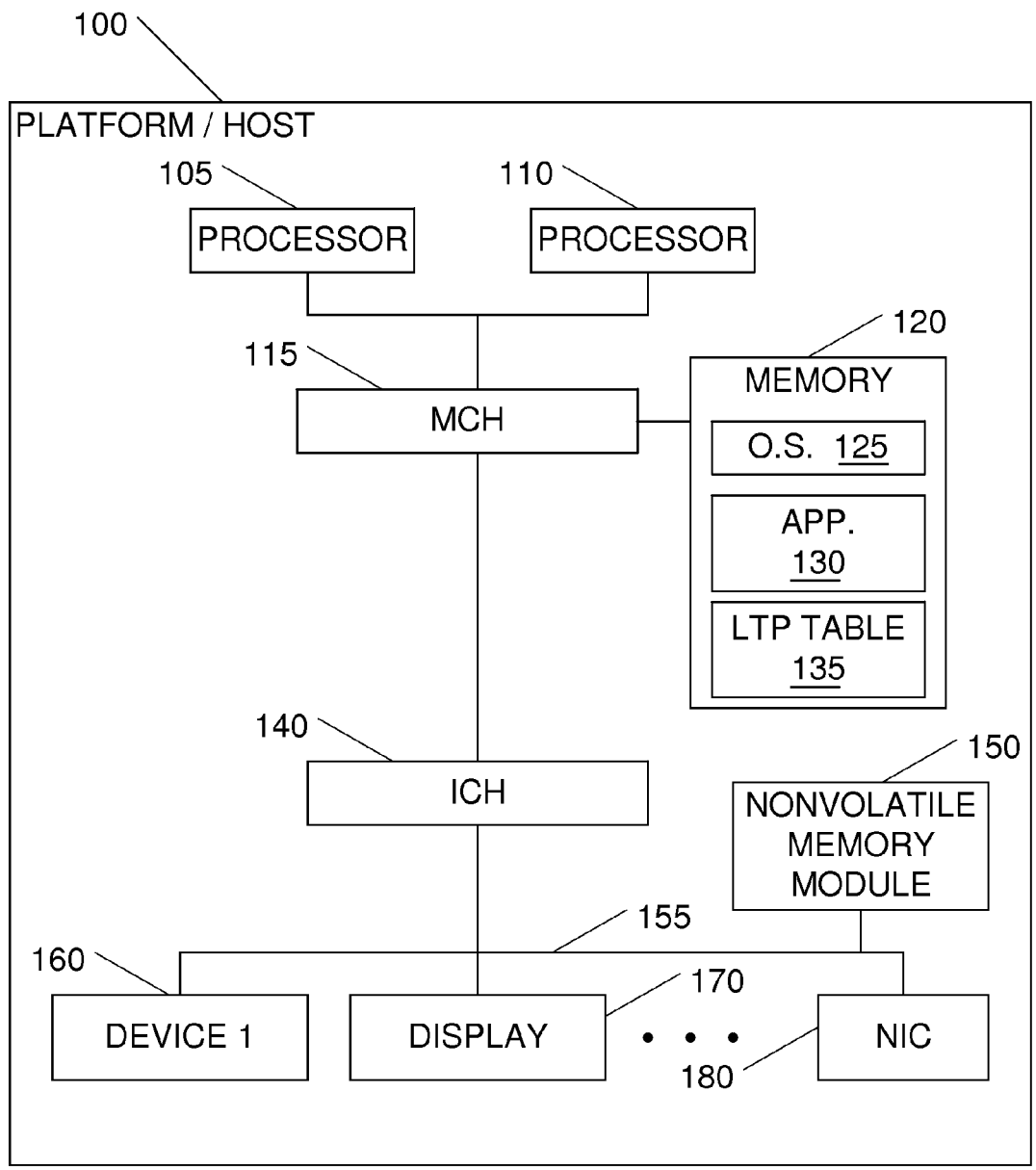
FIG. 1 depicts a system that may access data of a nonvolatile memory device using banded indirection, comprising multiple processors, nonvolatile memory, and multiple devices.

Turning now to the drawings, FIG. 1 illustrates a system that may access data of nonvolatile memory devices using banded indirection. As depicted in FIG. 1, a computing device or system, such as a host or platform 100, may have one or more modules of nonvolatile memory like nonvolatile memory 150. Platform 100 may read information from and write information to nonvolatile memory 150 while platform 100 operates. Nonvolatile memory 150 may comprise many different types of memory. For example, in one or more embodiments, nonvolatile memory 150 may comprise NAND flash memory. In one or more other embodiments, nonvolatile memory 150 may comprise polymer memory. In even further embodiments, nonvolatile memory 150 may comprise a combination of two or more types of nonvolatile memory, such as one NAND memory module and one programmable metallization cell memory module.

As shown in FIG. 1, platform 100 has two processors, processor 105 and processor 110. In different embodiments platform 100 may be a part of a variety of different computing devices. For example, in one embodiment platform 100 may comprise an embedded system. In other embodiments platform 100 may comprise a server, a desktop, a notebook, a hand-held computer, or other type of computing device, such as a consumer electronics device. Of the various embodiments, platform 100 may employ differing numbers of processors. For example, alternative embodiments may have a single processor, quad processors, or have more processors, such as eight or more.

The processors of platform 100 may be coupled to an interconnecting hub, such as memory controller hub (MCH) 115. One or more of the processors may execute operating instructions, such as instructions of an operating system (OS) 125, in memory 120 by interacting with MCH 115. Memory 120 may comprise, e.g., one or more dynamic random access memory modules. In a specific example, processor 110 may execute operating instructions of a web browser or a computer aided design (CAD) application for users of platform 100, as well as instructions of OS 125. Application 130 and OS 125 may store data in nonvolatile memory 150 using an LTP table 135. Application 130 and OS 125 may also retrieve data from nonvolatile memory 150 using LTP table 135 and banded indirection of nonvolatile memory 150.

OS 125 may comprise Linux®, Unix®, Macintosh® OS X, Windows®, or some other operating system, such as a proprietary operating system for an embedded system. Even further, some embodiments may operate multiple applications via multiple operating systems. For example, one system may execute virtualization software to isolate multiple operating systems and their applications from platform hardware resources and from each other. In other words, a system may execute several instances of an OS using virtual machine monitor (VMM) software, each instance of an OS being referred to as a virtual machine (VM) running in its own partition or section of memory. The VMM may manage the activities and requests of each OS, sharing control of actual system hardware as required. In the various embodiments one or more operating systems, may access data in nonvolatile memory 150 via banded indirection.

MCH 115 may also couple processors 105 and 110 with an input-output (I/O) controller hub (ICH) 140. ICH 140 may allow processors 105 and 110 to interact with internal components and/or external components. Stated slightly differently, ICH 140 may allow platform 100 to interact with component hardware, such as device 160, display 170, network interface controller (NIC) 180, nonvolatile memory 150, and other devices such as USB devices. For example, nonvolatile memory 150 may comprise a portable memory device such as a portable flash memory drive.

Platform 100 may present information to a user via display 170. In one embodiment, display 170 may comprise an Advanced Graphics Port (AGP) video card coupled to a computer monitor. The type of display device may be a cathode ray tube (CRT) monitor in one embodiment. In another embodiment, the display device of display 170 may comprise a liquid crystal display (LCD) screen, or a thin-film transistor flat panel monitor, as examples. Platform 100 may display information of application 130 via display 170. For example, platform 100 may comprise a portable multimedia device. Application 130 may comprise a video decoding and rendering program. Processor 105 may execute instructions of application 130, retrieve successive portions of a video file stored in nonvolatile memory 150, decode the portions via memory 120, and show the video to a user on display 170.

As shown in FIG. 1, platform 100 may employ numerous devices, such as device 160. Device 160 may comprise an input device, such as a keyboard, a mouse, a trackball, a touch-pad, an audio input device, a scanner, one or more computer speakers, or a touch-screen and stylus, as examples. Platform 100 may also have other types of devices, such as one or more storage devices. For example, device 160 may comprise an Advanced Technology Attachment (ATA) device, such as an ATA hard drive, a compact disc (CD) drive, or a digital versatile disc (DVD) drive. In another embodiment, device 160 may comprise a Serial ATA (SATA) device, such as a SATA hard drive. Alternatively, in one or more embodiments, platform 100 may also have one or more small computer systems interface (SCSI) devices, such as a SCSI hard drive or a Redundant Array of Inexpensive Disks (RAID). Platform 100 may transfer information between device 160 and nonvolatile memory 150.

Platform 100 may communicate with numerous other computing devices coupled to platform 100 via NIC 180. For example, NIC 180 may couple platform 100 to numerous computers on a local area network (LAN) and/or a remote area network, which may include the Internet. Such computers may comprise notebook, desktop, or server computers, as examples, coupled to platform 100 via one or more networking devices, such as network routers, hubs, switches, and wireless networking devices. The computers coupled to platform 100 via NIC 180 may cause platform 100 to access information of nonvolatile memory 150. For example, platform 100 may employ remote management hardware and software that allow a person using a remote computer to retrieve and update values of data in nonvolatile memory 150. Platform 100 may also transfer data between NIC 180 and nonvolatile memory 150.

Figure 2:
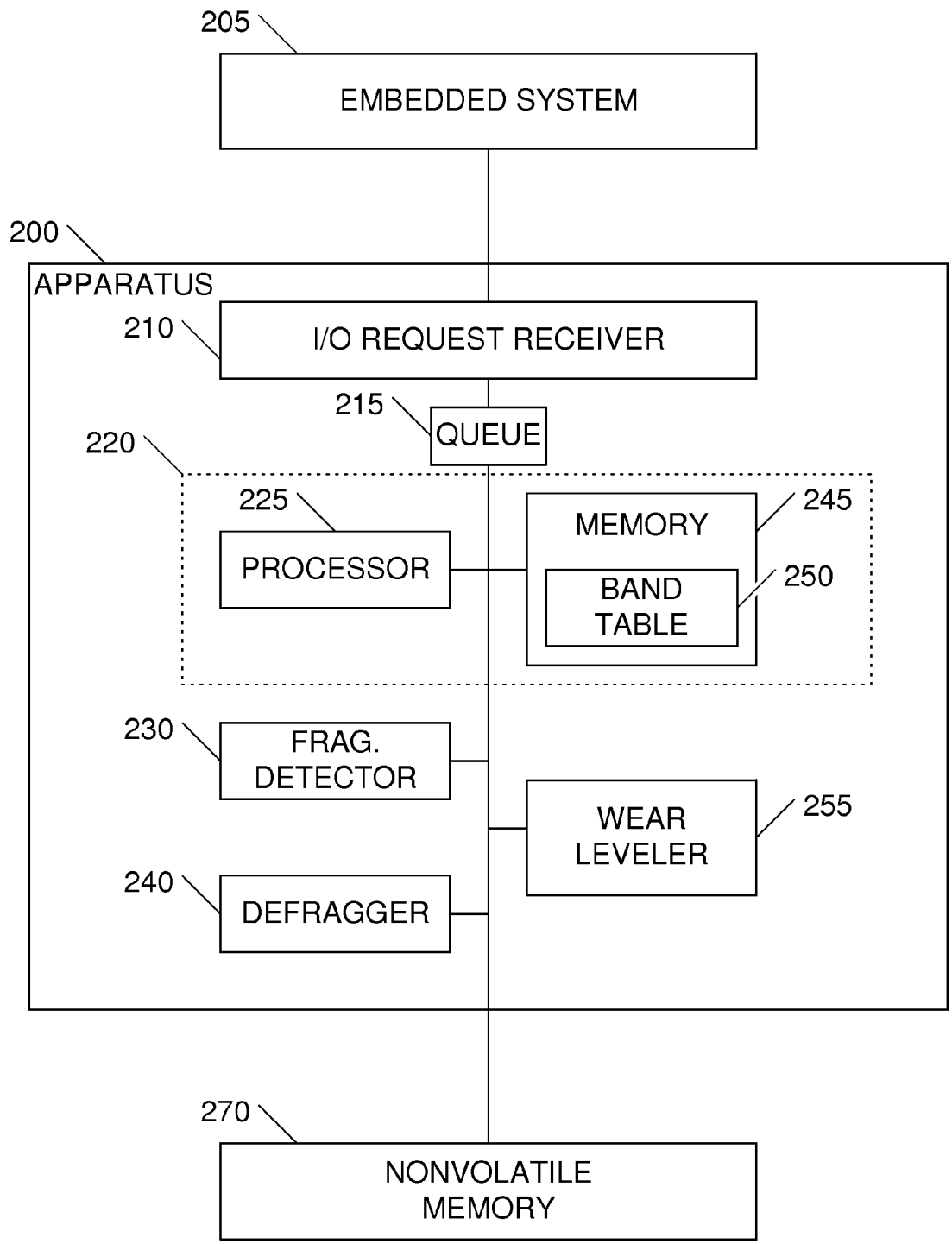
FIG. 2 illustrates how an apparatus employing a data access module may use a band table to access data of nonvolatile memory.

To illustrate how a system may access data of a nonvolatile memory device using banded indirection in one or more embodiments, we turn to FIG. 2. FIG. 2 depicts an embodiment of an apparatus 200. In one or more embodiments, apparatus 200 may comprise a chipset on a main board, coupling nonvolatile memory 270 to a system, such as embedded system 205. For example, apparatus 200 may comprise a chipset coupling ICH 140 to nonvolatile memory 150 via a platform bus 155 in FIG. 1. Apparatus 200 may alternatively comprise a hardware interface implemented on a peripheral card inserted into a motherboard or main board, or as an application specific integrated circuit chip (ASIC).

Apparatus 200 may receive I/O requests from embedded system 205 and processes those requests for nonvolatile memory 270. Apparatus 200 may comprise hardware that executes software and/or firmware instructions to communicate with embedded system 205 to read data from and write data to nonvolatile memory 270 in a manner similar to a mass-storage block-based storage device, such as a hard disk drive. As depicted in FIG. 2, apparatus 200 may have a data access module 220 comprising a processor 225 and local memory 245. Data access module 220 may perform a logical-to-physical translation to present the linear, block-oriented view of the memory of nonvolatile memory 270 to embedded system 205 or to software, such as application 130 or OS 125, when apparatus 200 comprises part of a platform/host system. In other words, when reading and writing information, apparatus 200 may make nonvolatile memory 270 appear as a contiguous array of storage blocks to systems or software coupled to apparatus 200, even though the data may be remapped and written to different physical locations or regions of nonvolatile memory 270.

Logical-to-physical translation may be employed due to the nature of nonvolatile memory 270. For example, nonvolatile memory 270 may comprise NAND-based memory. Apparatus 200 may erase sections of nonvolatile memory 270 before writing data, perform wear leveling to extend the life of nonvolatile memory 270, and handle bad blocks and other media issues that may be associated with nonvolatile memory 270. To implement logical-to-physical translation, a host system like platform 100 coupled to apparatus 200 may use LTP table 135 stored in memory 120 to map logical pages corresponding to physical NAND pages stored on nonvolatile memory, such as nonvolatile memory 150 or nonvolatile memory 270. For example, nonvolatile memory 150 may comprise 4 kilobyte (KB) NAND pages. LTP table 135 in memory 120 may have one 32 bit table entry for each 4 KB NAND page. Correspondingly, the array size may comprise 1 megabyte (MB) for each 1 gigabyte (GB) of nonvolatile memory 150.

Figure 3A:
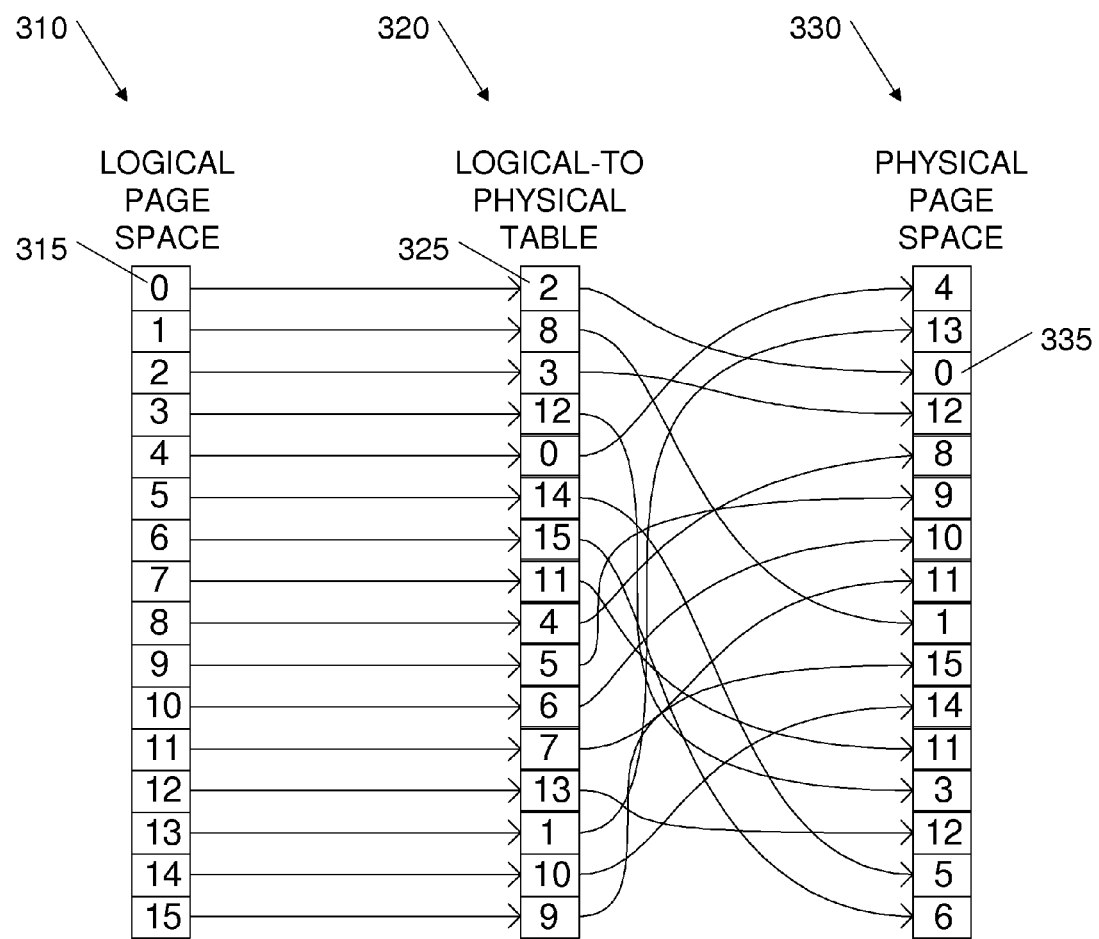
FIG. 3A illustrates how a logical-to-physical translation table may correlate logical page numbers to physical page numbers for a nonvolatile memory device.

An example LTP table is shown in FIG. 3A. FIG. 3A illustrates how an LTP table 320 may translate or correlate logical page numbers, or logical page addresses, of a logical page space 310 to a physical page space 330 for a nonvolatile memory device. For example, LTP table 320 may reside in main memory of a system, such as LTP table 135 in memory 120. Alternatively, depending on the embodiment, LTP table 320 may reside in memory of embedded system 205. However, embedded system 205 or platform 100 may have limited DRAM available to store LTP table 320. If the size of a nonvolatile memory device is relatively large, such as 128 GB or 256 GB, LTP table 320 my be relatively large, being many megabytes in size. One method of storing a large LTP table 320 may comprise storing LTP table 320 in nonvolatile memory in some alternative embodiments, such as nonvolatile memory 150 or nonvolatile memory 270.

Each "block" depicted for logical page space 310 (shown labeled 0-15), for LTP table 320, and for physical page space 330 may represent a unit of indirection and vary from embodiment to embodiment. For example, each block may be a portion or section of memory unit(s). In one embodiment, a block of FIG. 3A may represent a sector of storage space. In other embodiments, a block may represent a NAND page, an erase block, or other size memory storage unit. In the discussions that follow for FIG. 3A and FIG. 3B, each block may refer to pages of a NAND memory device.

During operation embedded system 205 may issue an I/O command to apparatus 200, such as a read request for information starting at logical page 0 (element 315). I/O request receiver 210 may receive the read request and place the request in queue 215. Processor 225 may retrieve the read request from queue 215 for processing. To process the read request, processor 225 may access LTP table 320, which may be stored in nonvolatile memory 270. In accessing LTP table 320, processor 225 may determine that the data stored for logical page 0 (element 315) has a corresponding LTP table 320 indirection reference (element 325) equal to 2. Consequently, processor 225 may then access the starting address of physical page 2 (element 335), which corresponds to indirection reference (element 325) of LTP table 320. Processor 225 may read the contents of physical page 2 (element 335) from nonvolatile memory 270, and transfer the data read back to embedded system 205.

Processing all I/O requests using an LTP table stored in nonvolatile memory 270 or in DRAM of embedded system 205 may be relatively slow or otherwise undesirable, such as by impacting the performance of embedded system 205. Additionally, apparatus 200 may employ banded indirection to process I/O requests. Nonvolatile memory 270, which may comprise a NAND memory device, may be logically divided into "bands". Each band may comprise a set of pages. The number of pages, or other units of memory based on the embodiment, in a band may vary. The number of pages in a band may be based on physical considerations of the nonvolatile device, such as the erase block size and available memory of embedded processor 205. An example band size may comprise 1024 NAND pages, for a band size of 4 MB. A 16 GB NAND array, then, may comprise 4096 bands. Band sizes may comprise other numbers of pages as well, such as 2048 pages.

Depending on the embodiment, apparatus 200 may conduct numerous other activities when using banded indirection to perform I/O operations with nonvolatile memory 270. For example, nonvolatile memory 270 may have a limited life span. More specifically, nonvolatile memory 270 may comprise NAND flash memory having a limited life of approximately 100,000 erase-write cycles. To help extend the life of nonvolatile memory 270, one or more embodiments may employ wear leveling techniques via a wear leveler 255. Wear leveler 255 may comprise, e.g., one or more chipsets that perform wear leveling for saves of data to nonvolatile memory 270. Wear leveler 255 may store or remap different physical locations for specific logical address locations specified by write requests from embedded system 205 or platform 100. As apparatus 200 reads and writes data to nonvolatile memory 270, over time wear leveler 255 may store data of logical pages in various physical page locations in a disorganized manner, with such resulting logical-to-physical page correlations as those depicted in FIG. 3A.

As part of implementing banded indirection, apparatus 200 may periodically reorganize data stored in nonvolatile memory 270 via defragger 240. Defragger 240 may take data stored in noncontiguous fragments in various physical pages, rearrange the data, and rewrite the data in contiguous physical pages. For example, defragger 240 may take a file stored in various physical pages of nonvolatile memory 270 and store the file in consecutive physical pages. By way of a more specific illustration, defragger 240 may store the file in contiguous physical pages 360, which may correspond to the contiguous logical pages 340.

Defragger 240 and wear leveler 255 may defragment bands of nonvolatile memory 270, so that physical bands contain logically consecutive sets of pages. In one or more embodiments, defragger 240 and wear leveler 255 may perform the defragmentation and wear leveling functions as part of routine operations, such as during each write request. In other embodiments, however, defragger 240 and wear leveler 255 may perform the defragmentation and wear leveling functions on a periodic basis. For example, wear leveler 255 may process write requests without defragger 240 performing any defragmentation. Once fragmentation detector 230 detects that a certain percentage of the data of nonvolatile memory 270 is fragmented, such as fragmentation of 20% of the data, the embodiment may cause defragger 240 to rearrange the data to reduce fragmentation.

When defragger 240 defragments a band, defragger 240 may cause processor 225 to mark the band as being "clean" in band table 250 of local memory 245. Processor 225 may mark a band as being clean by, e.g., setting a bit or a flag in band table 250. Alternatively, in alternative embodiments, fragmentation detector 230 may mark a band as being clean by storing a band table value corresponding to a physical page number. Additionally, if a band is fragmented, defragger 240 may cause processor 225 to mark the band as "dirty" in band table 250. In other words, processor 225 may maintain band table 250, which may describe the state of each band of nonvolatile memory 270. If a band is defragmented, processor 225 may also store one or more values for accessing data of the band, such as by storing the physical address of the first page in band table 250.

In alternative embodiments, fragmentation detector 230 may be able to determine whether a band is fragmented or defragmented based on the value in band table 250. If the value is zero, some impermissibly large number given the size of the nonvolatile memory device, a negative number, or a number with an invalid checksum, fragmentation detector 230 may detect that the band is dirty. If the value is a number of an existing band number, and the checksum indicates the value is correct, fragmentation detector 230 may detect that the band is clean.

The size of band table 250 may differ from embodiment to embodiment, depending on such embodiment specifications as, e.g., the size of nonvolatile memory 270, the erase block size, the band size, and the available local memory of embedded processor 205. For example, if an embodiment has a 16 GB NAND array and an 8 MB band size, the size of band table 250 may be 8 KB.

Figure 3B:
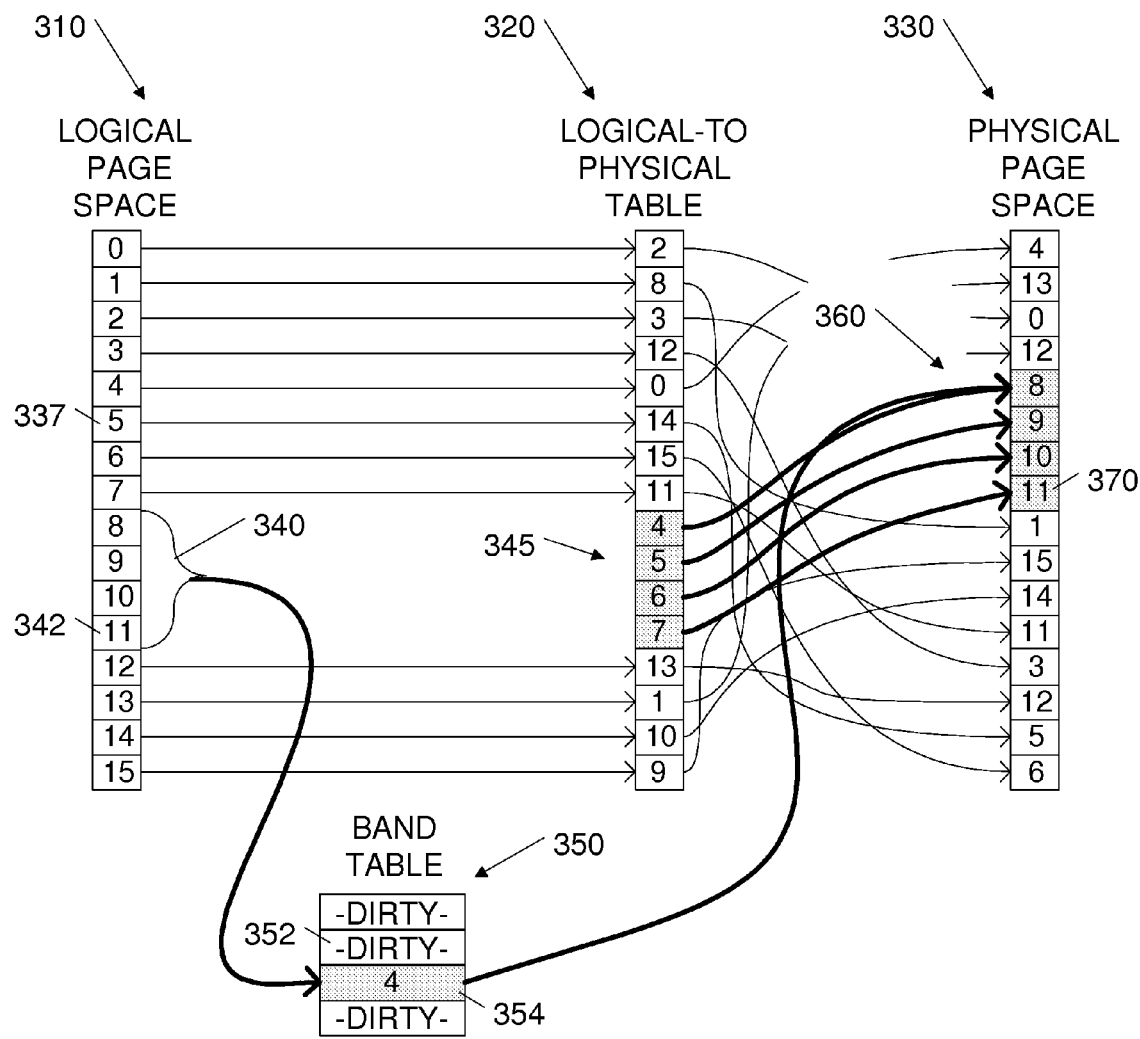
FIG. 3B illustrates how a band table may be used to provide a physical address for a defragmented band of a nonvolatile memory device.

How an embodiment may use banded indirection is illustrated in FIG. 3B. In FIG. 3B, logical page space 310 and physical page space 330 are shown with each having 16 pages. Band table 350 has a size of 4 pages per band. So, for the illustration of FIG. 3B, band table 350 has a size of four bands to cover all of the 16 different pages of logical page space 310 and physical page space 330. FIG. 3B is for illustration. In alternative embodiments, the numbers of pages and the numbers of bands for band tables may be much larger.

When a host or embedded system submits a read request to apparatus 200, data access module 220 may respond to the request by checking band table 250 which, for the sake of example, may represent band table 350. For example, embedded system 205 may submit a read request to apparatus 200 for the contents of logical page 5 (element 337). Data access module 220 may respond to the read request by first determining the band associated with logical page 5 (element 337). Processor 225 may divide the address of logical page 5 by the band size for a result of one; 5/4=1. Using a base of 0, fragmentation detector 230 may then check the entry of band number 1 (element 352) in band table 350 and detect that band number 1 (element 352) is dirty, or fragmented. Because band number 1 is dirty, fragmentation detector 230 may cause processor 225 to consult the LTP table. For example, processor 225 may load a portion of LTP table 320 from nonvolatile memory 270 into local memory 245. Processor 225 may then retrieve a value of "14" from LTP table 320, which corresponds to the address of logical page 5 (element 337). Processor 225 may then read the data for logical page 5 (element 337) from physical page 14 via physical page space 330.

Another example may illustrate some of the actions that an embodiment may perform in executing a read request for data of a clean band. Embedded system 205 may submit a read request to apparatus 200 for the contents of logical page 11 (element 342). Data access module 220 may respond to the read request by determining the band number associated with logical page 11 (element 342). Processor 225 may divide the address of logical page 11 by the band size for a result of two; 11/4=2, with a remainder of 3. Using a base of 0, fragmentation detector 230 may then check the entry of band number 2 (element 354) in band table 350 and detect that band number 2 (element 354) is clean, or defragmented. Because band number 2 (element 354) is clean, fragmentation detector 230 may cause processor 225 to consult band table 350 to determine the address of the physical page from which to read the data for logical page 11 (element 342).

As illustrated in FIG. 3B, band number 2 (element 354) contains a physical page address of 4, which is the starting physical address for the first page of band number 2 (element 360) of physical address space 330. To determine the specific physical page address corresponding to logical page 11 (element 342), processor 225 may use the remainder from the band number calculation. The remainder of dividing logical page 11 (element 342) by the band size, 11%4, is equal to 3 so the offset in this specific case would be 3. Processor 225 may then add the offset, 3, to the starting physical page address, 4, to arrive at a specific physical page address of 7 (element 370). Processor 225 may then read the data for logical page 11 (element 342) from physical page 7 (element 370) via physical page space 330.

As illustrated by FIG. 3B, if the band containing the logical page is 'clean', an embodiment may use the physical page address contained in the band table, along with an offset, as the physical NAND address number. In other words, the embodiment may not have to access an LTP table in DRAM or nonvolatile memory. If the band containing the logical page is 'dirty', the embodiment may then read the physical indirection page address out of the LTP table stored in DRAM or nonvolatile memory.

Some embodiments may perform additional tasks, such as caching sections of the LTP table in local SRAM as well, which may comprise local memory 245. Some embodiments may cache some of the results of the LTP lookups to minimize the lookup time for future read requests of the same logical addresses. Additionally, some embodiments may implement a caching scheme comprising multiple layers, with portions of the complete LTP table stored, or cached, in the local memory 245, host DRAM, and/or nonvolatile memory 270.

When a host or an embedded system submits a write request to apparatus 200 via I/O request receiver 210, processor 225 may work in conjunction with wear leveler write the data to nonvolatile memory 270 in a nonconsecutive manner, with other logical pages in the bands. In other words, writing data to the bands may fragment the bands. Processor 225 may respond by marking the bands 'dirty' in the band table, so that future reads may use the LTP table. At some point in the future, defragger 240 may defragment the bands of nonvolatile memory 270.

The arrangement depicted in FIG. 2 may represent one embodiment. Alternative embodiments may contain fewer modules than those depicted in FIG. 2. For example, while the embodiment presented in FIG. 2 illustrates how fragmentation detector 230 may be in a separate module from processor 225, some embodiments may combine fragmentation detector 230 into data access module 220. More specifically, data access module 220 may contain a processor/fragmentation detector module that may perform the functions of both a processor and a fragmentation detector. Additionally, some embodiments may have a single module that performs the functions of both wear leveler 255 and defragger 240. For example, an embodiment may have a defragmentation and wear leveler module that attempts to store data on consecutive physical bands of nonvolatile memory 270 as apparatus 200 writes the data.

Other embodiments of apparatus 200 may comprise one or more other modules than the ones depicted in FIG. 2. Apparatus 200 may have an error correction code module to calculate error correcting code for the values of the write requests. For example, nonvolatile memory 270 may employ uniform-sized data pages. Each data page may be the same size as a virtual block used by an operating system, such as 512 bytes. The error correction code module may calculate forward error correction bits for each portion or string of data being saved to nonvolatile memory 270 and append the correction bits to the data as it is being written. In different embodiments, the error correction code may be calculated at different times. For example, in one embodiment the error correction code may be calculated before wear leveler 255 performs the wear leveling protection. In another embodiment, the error correction code may be calculated after wear leveler 255 performs the wear leveling protection.

Alternative embodiments of apparatus 200 may have a bad block management module to detect problems of nonvolatile memory 270. For example, nonvolatile memory 270 may have blocks, or pages, that contain one or more bits that are invalid or unreliable. The bad block management module may create a table that lists all blocks that contain invalid or unreliable bits of nonvolatile memory 270. The bad block management module may prevent data access module 220, as well as wear leveler 255 and defragger 240, from accessing or otherwise writing data to blocks in the table of bad blocks. Additionally, data access module 220 may receive the list of bad blocks from the bad block management module and update band table 250 accordingly. For example, processor 225 may mark bands that contain bad blocks as "dirty" by setting flags in band table 250.

Further alternative embodiments may include a garbage collection module. For example, as wear leveler 255 moves and writes data to nonvolatile memory 270, data access module 220 may mark affected pages so that the pages can be reclaimed and reused. In other words, the garbage collection module may erase discarded pages so that the pages may be reused. The garbage collection may work in conjunction with fragmentation detector 230, defragger 240, and wear leveler 255 when marking bands as fragmented or defragmented.

One or more elements of apparatus 200 may be in the form of hardware, software, or a combination of both hardware and software. For example, in one embodiment, one or more of the modules of apparatus 200 may comprise software coded instructions stored in a tangible medium for a band indirection application, executed in memory by a processor of, e.g., a computer or microcontroller. In other words, one embodiment of apparatus 200 may comprise portions of a band indirection application of a computer system or an embedded system, like embedded system 205 shown in FIG. 2, closely coupled with nonvolatile memory 270. Additionally, depending on the embodiment, one or more of the elements of apparatus 200 may reside in one or more computer systems or embedded systems. For example, in one embodiment, the elements of apparatus 200 may reside in a single desktop computer. In an alternative embodiment, some elements of apparatus 200 may reside on one computing platform, such as a server, while other elements reside on another computing platform or computing device, such as an embedded system in a manufacturing environment, and work together via a network or communication bus.

FIG. 4A and FIG. 4B show flowcharts for how one or more embodiments may process read requests and write requests using banded indirection. FIG. 4A shows a flowchart 400 describing the actions that one or more embodiments using banded indirection, such as platform 100 or apparatus 200, may perform when executing a read request when the embodiments implement banded indirection for nonvolatile memory. For example, one or more embodiments may implement the process illustrated in FIG. 4A, or at least a portion of the process, as firmware or hardware-encoded instructions in a tangible medium of an interface apparatus for nonvolatile memory. Such instructions may be stored in one or more hardware integrated circuit packages, which may include memory components of a platform or computing device, such as apparatus 200 of FIG. 2.

Flowchart 400 begins with receiving a read request (element 410) and calculating the band associated with the request (415). An illustration of receiving a read request and calculating a band of the may be when nonvolatile memory module 150 receives a read request from processor 110 for data stored in nonvolatile memory 150. Processor 110 may be executing application 130, which may comprise a spreadsheet application as an example. Application 130 may be trying to open a spreadsheet file stored in nonvolatile memory 150. Processor 110 may issue a read request for data stored in logical page 10 of logical page space 310. Platform 100 may have LTP table 320 stored in memory 120, such that LTP table 135 in FIG. 1 represents LTP table 320 of FIG. 3B. Nonvolatile memory 150 may have an embedded processor for processing read requests and write requests. Assuming that the band sizes are 4 pages, nonvolatile memory 150 may store and table 350 in local memory coupled with the embedded processor of nonvolatile memory 150. With a logical page address of 10, and a band size of 4 pages, the embedded processor may calculate the band associated with logical page 10 as band number 2 (element 354).

The embedded processor of nonvolatile memory 150 may then determine whether band number 2 (element 354) of band table 350 is storing a starting physical address or page number (element 420). As depicted in FIG. 3B, band number 2 (element 354) is storing a starting physical address of 4. The embedded processor of nonvolatile memory 150 may then detect whether band number 2 (element 354) is fragmented or defragmented (element 425). For example, the embedded processor of nonvolatile memory 150 may detect whether a "fragmented" bit is set to a value of in the entry of the table corresponding to band number 2 (element 354).

If the embedded processor of nonvolatile memory 150 determines that band number 2 (element 354) is fragmented (element 425), the embedded processor may cause an LTP table lookup (element 435) via LTP table 135 in memory 120. For example, the embedded processor may send a request to processor 105 asking for the physical page address of the entry corresponding to logical page number 10. Processor 105 may respond to the request by returning a value of "6". The embedded processor may then perform a read operation (element 440) on nonvolatile memory 150 to retrieve the contents stored in physical page 6.

If the embedded processor of nonvolatile memory 150 determines that band number 2 (element 354) is defragmented (element 425), the embedded processor may calculate the starting physical page number of band number 2 (element 354), using the logical page number, 10, the band size, 4, the stored physical starting address of band number 2 (element 354), and the calculated offset (element 430). For example, the embedded processor may determine that the remainder after dividing the band size of 4 into the logical page number of 10 is 2. Adding the remainder, 2, to the stored starting physical address, 4, the embedded processor may determine that the physical page number corresponding to logical page number 10 is physical page number 6. The embedded processor may then perform a read operation (element 440) on nonvolatile memory 150 to retrieve the contents stored in physical page 6.

Flowchart 450 illustrates the actions that one or more embodiments which implement banded indirection for nonvolatile memory, such as platform 100 or apparatus 200, may perform when executing a write request. Flowchart 450 begins with receiving a write request (element 455) and calculating the band associated with the write request (460). Continuing with our previous illustration, processor 110 may be executing application 130. Application 130 may be trying to write a modified version of a spreadsheet file back to nonvolatile memory 150. Processor 110 may issue a write request to store the data in logical page 10.

With a logical page address of 10, and a band size of 4 pages, the embedded processor may calculate the band associated with logical page 10 to be band number 2 (element 354). The embedded processor may then mark band number 2 (element 354) of band table 350 as being fragmented (element 465), such as by setting a bit corresponding to band number 2 (element 354) or storing a zero value to replace the existing value of 4. For example, a fragmentation to detector of nonvolatile memory 150 may interpret a value of zero in any of the entries of band table 350 to mean the associated band is fragmented.

The embedded processor may then execute the write operation (470), to store the contents of the modified file in an available physical memory location of nonvolatile memory 150. For example, the embedded processor of nonvolatile memory 150 may perform a wear leveling calculation, determine an unused section of nonvolatile memory 150 capable of storing the modified file, and write the file to the unused section. Additionally, the embedded processor may update appropriate entries in LTP table 135, which may represent LTP table 320.

Figure 5:
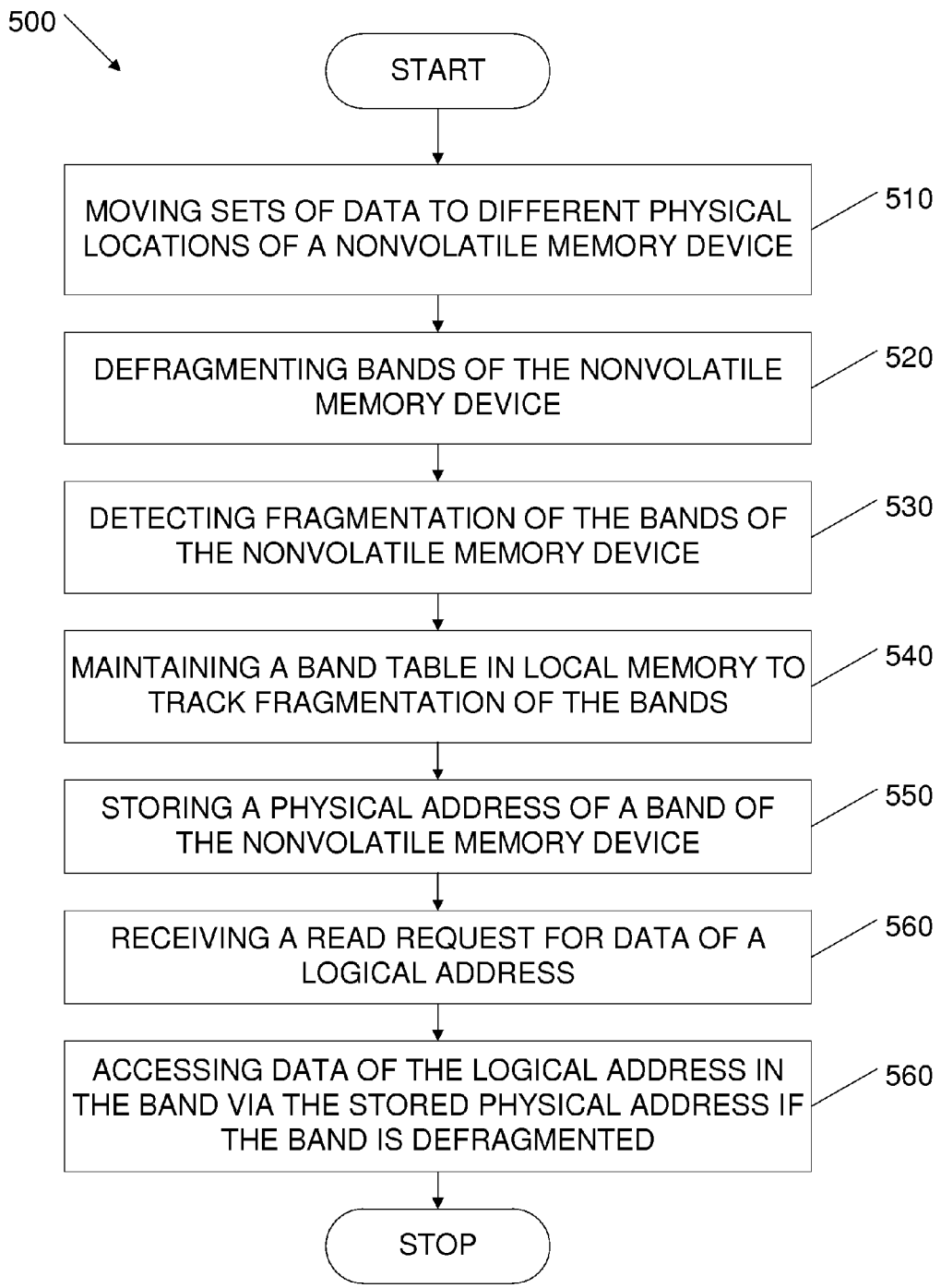
FIG. 5 illustrates a method of performing wear leveling, defragmenting, maintaining a band table, and accessing data of a nonvolatile memory device using a physical address of the band table.

FIG. 5 illustrates a method of performing wear leveling, defragmenting, maintaining a band table, and accessing data of a nonvolatile memory device using a physical address of the band table. For example, the method may be executed by state-machine hardware or firmware in an ASIC chip of an embedded system that uses nonvolatile memory, such as an ASIC in flash memory card for a digital camera. Flowchart 500 begins with moving sets of data to different physical locations of a nonvolatile memory device (element 510) and defragmenting bands of the nonvolatile memory device (element 520). For example, wear leveler 255 of apparatus 200 may write data to different physical pages of nonvolatile memory 270, for write requests received from embedded system 205, in an attempt to extend the life of nonvolatile memory 270. Defragger 240 may periodically rearranged the data stored on nonvolatile memory 270, so that physical bands of nonvolatile memory 270 contain logically consecutive sets of pages.

Apparatus 200 may continue by detecting fragmentation of the bands of the nonvolatile memory (element 530) and maintaining a band table in local memory to track fragmentation of the bands (element 540). For example, after defragger 240 completes a periodic rearrangement of the data on nonvolatile memory 270, fragmentation detector 230 may perform an analysis of how the file structures are spread among the physical pages, determine whether any bands contain consecutive pages of information, and clear fragmentation bits in band table 250 for bands that are defragmented. Additionally, fragmentation detector 230 may use information provided by other modules of apparatus 200 when determining fragmentation of the bands of nonvolatile memory device 270, such as a bad block manager module and/or an error code correction module. For bands that fragmentation detector 230 determines are defragmented, fragmentation detector 230 may store physical addresses that processor 225 may subsequently use for executing read requests. For example, fragmentation detector 230 may store the physical ending addresses for defragmented bands (element 550), whereupon processor 225 may calculate specific physical pages corresponding to specific logical pages by subtracting offset values from the physical ending addresses.

Apparatus 200 may then receive read requests for data of logical addresses (element 560) and access data of the logical addresses in bands of the nonvolatile memory device via the stored physical addresses for bands that are defragmented (element 560). Continuing with our previous example, data access module 220 may receive a read request via I/O request receiver 210 and queue 215. Processor 225 may use the logical page number and band size to determine a corresponding band number. Processor 225 may then examine band table 250 in local memory 245 to determine whether the band is defragmented, and if so, use the physical address stored in band table 250 to read the contents of the stored physical address. Otherwise, if processor 225 determines that the band is fragmented, processor 225 may then determine a physical address associated with the logical page number via an LTP table stored in nonvolatile memory 270 or in memory of embedded system 205.

Another embodiment may be implemented as a program product, such as firmware, for use with a computing device or platform to perform banded indirection. The program(s) of the program product may define functions of the embodiments (including the methods described herein) and can be contained on a variety of tangible, data-bearing, media. Illustrative data-bearing media include, but are not limited to: (i) information permanently stored on non-writable storage media (e.g., read-only memory devices within a computer, such as on a platform motherboard); and (ii) alterable information stored on writable storage media (e.g., floppy disks within a diskette drive or hard-disk drive). Such data-bearing media, when carrying computer-readable instructions that direct the functions of the one or more systems or devices, represent embodiments of the present invention.

The routines executed to implement the embodiments of the invention, may be part of a component, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus an embodiment should not be limited to use solely in any specific application identified and/or implied by such nomenclature.

It will be apparent to those skilled in the art having the benefit of this disclosure that the disclosure contemplates apparatuses, systems, and computer program products that access data of nonvolatile memory devices using banded indirection. It is understood that the form of the embodiments shown and described in the detailed description and the drawings are to be taken merely as examples. It is intended that the following claims be interpreted broadly to embrace all the variations of the embodiments disclosed.

Although some of the aspects have been described in detail for some embodiments, it should be understood that various changes, substitutions and alterations can be made herein without departing from the spirit and scope of alternative embodiments as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the present embodiments. Accordingly, the appended claims are intended to include within their scope such processes, machines, manufacture, compositions of matter, means, methods, or steps.

What is claimed is:

1. A method, comprising:
   tracking fragmentation of a band of physical addresses of a nonvolatile memory device;
   storing, in local memory of the nonvolatile memory device, a physical address of the band; and
   maintaining a band table in the local memory to track fragmentation of bands of the nonvolatile memory device,
   accessing data of a logical address of the band via the stored physical address based on the fragmentation of the band.

2. The method of claim 1, further comprising moving, periodically, sets of data to different physical addresses of the nonvolatile memory device to increase a life cycle of the nonvolatile memory device.

3. The method of claim 2, wherein the moving comprises defragmenting bands of the nonvolatile memory device, such that the bands comprise data of consecutive logical addresses.

4. The method of claim 1, wherein the band comprises a set of 2048 pages.

5. The method of claim 1, further comprising receiving a read request for the data from a host and accessing the data of the logical address via a second physical address stored in host memory when the band is fragmented.

6. An apparatus, comprising:
   a nonvolatile memory element to store data, wherein the nonvolatile memory element comprises bands of physical addresses;
   a fragmentation detector to detect fragmentation of a band of the nonvolatile memory element, wherein the fragmentation detector detects fragmentation of the band via a bit in a band table; and
   a data access module to access data of a logical address of the band via a physical address based on the fragmentation.

7. The apparatus of claim 6, further comprising a defragmentation module to arrange data of logical addresses consecutively in the bands.

8. The apparatus of claim 6, further comprising a wear leveling module to move data among the bands to extend a life cycle of the nonvolatile memory element.

9. The apparatus of claim 6, wherein the data access module comprises an embedded processor coupled with local memory.

10. The apparatus of claim 9, wherein the processor is arranged to maintain a band table in the local memory with the band table storing physical addresses of the bands.

11. The apparatus of claim 10, wherein each entry in the band table comprises a starting address of physical addresses of the bands.

12. The apparatus of claim 11, further comprising a host coupled to the nonvolatile memory element, the host comprising a dynamic random access memory module to store physical indirection addresses in a logical-to-physical table.

13. The apparatus of claim 6, wherein the nonvolatile memory element comprises NAND flash memory.

14. The apparatus of claim 6, wherein the data access module is arranged to write data to the bands non-consecutively.

15. A computer program product comprising a tangible computer usable medium having computer usable program code for reading data from nonvolatile memory, the computer program product including:
   computer usable program code for receiving a read request for a logical page of the nonvolatile memory;
   computer usable program code for detecting fragmentation of a band of the nonvolatile memory via a status bit in a band table, wherein the band comprises a physical page that corresponds to the logical page; and
   computer usable program code for reading the data from the nonvolatile memory via the physical page if the band is defragmented.

16. The computer program product of claim 15, further comprising computer usable program code for performing a calculation to determine a second physical page based on the physical page and an offset value.

17. The computer program product of claim 15, further comprising computer usable program code for storing data in contiguous physical pages of the nonvolatile memory.

18. The computer program product of claim 15, further comprising computer usable program code for calculating a band number based on the logical page number and computer usable program code for accessing a logical-to-physical table to determine the physical page that corresponds to the logical page.

19. The computer program product of claim 15, wherein the computer usable program code for detecting fragmentation of the band comprises computer usable program code for determining a number in a band table equals a nonzero number.

* * * * *